United States Patent
Moran et al.

(10) Patent No.: US 9,371,764 B2
(45) Date of Patent: Jun. 21, 2016

(54) AFTER-TREATMENT COMPONENT

(71) Applicant: GM GLOBAL TECHNOLOGY OPERATIONS LLC, Detroit, MI (US)

(72) Inventors: Robert J. Moran, Ann Arbor, MI (US); David E. Winn, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 397 days.

(21) Appl. No.: 13/956,956

(22) Filed: Aug. 1, 2013

(65) Prior Publication Data

US 2015/0037219 A1 Feb. 5, 2015

(51) Int. Cl.
| | |
|---|---|
| *F01N 3/28* | (2006.01) |
| *B01D 53/94* | (2006.01) |
| *F01N 3/10* | (2006.01) |
| *F01N 3/20* | (2006.01) |
| *F01N 3/035* | (2006.01) |
| *F01N 13/00* | (2010.01) |

(52) U.S. Cl.
CPC .............. *F01N 3/2803* (2013.01); *F01N 3/035* (2013.01); *F01N 3/103* (2013.01); *F01N 3/2066* (2013.01); *F01N 3/28* (2013.01); *F01N 3/2892* (2013.01); *F01N 13/0097* (2014.06); *F01N 2470/18* (2013.01); *F01N 2610/02* (2013.01); *Y02T 10/24* (2013.01)

(58) Field of Classification Search
USPC ............................................ 422/176; 60/286
See application file for complete search history.

(56) References Cited

U.S. PATENT DOCUMENTS

| | | | | |
|---|---|---|---|---|
| 6,312,650 | B1 * | 11/2001 | Frederiksen ....... | B01D 53/9431 181/264 |
| 2011/0219755 | A1 * | 9/2011 | Muller-Haas ........... | F01N 3/035 60/287 |
| 2013/0276438 | A1 * | 10/2013 | De Rudder ................ | F01N 3/00 60/324 |

FOREIGN PATENT DOCUMENTS

EP 1479883 A1 11/2004

OTHER PUBLICATIONS

Yara et al. What is AdBlue? NOx Reduction. AdBlue in SCR Technology. 2011. pp. 1-4 http://yara.co.uk/nox-reduction/adblue-for-vehicles/what-is-adblue/.*
ACEA. Diesel Exhaut Fluid—AdBlue. European Automobile Manufacturers Association. 2015. pp. 1-4 http://www.acea.be/industry-topics/tag/category/diesel-exhaust-fluid-adblue.*
German Office Action for DE Application No. 102014110592.3; dated Oct. 28, 2014, pp. 1-4.

* cited by examiner

*Primary Examiner* — Walter D Griffin
*Assistant Examiner* — Jelitza Perez
(74) *Attorney, Agent, or Firm* — Cantor Colburn LLP

(57) ABSTRACT

An after-treatment component for receiving an exhaust stream from an internal combustion engine comprises a vessel having a first end, a second end, and an intermediate section. The vessel defines an inlet port and an outlet port. The inlet port is in fluid communication with an inlet diffuser disposed within the vessel. The inlet diffuser is in fluid communication with the inlet port and with a diesel oxidation catalyst disposed within the vessel. The diesel oxidation catalyst is in fluid communication with the inlet diffuser and with a transfer duct. The transfer duct is in fluid communication with the diesel oxidation catalyst and with an intermediate diffuser disposed within the vessel. The intermediate diffuser is in fluid communication with the transfer duct and with a catalyzed filter disposed within the vessel. The catalyzed filter is in fluid communication with the intermediate diffuser and with the outlet port.

20 Claims, 4 Drawing Sheets

AFTER-TREATMENT COMPONENT

FIELD OF THE INVENTION

The subject invention relates to after-treatment systems for internal combustion engines and, more particularly, to an after-treatment component having a compact package.

BACKGROUND

In modern internal combustion engines, such as diesel engines, complex after-treatment systems have been developed to reduce the concentrations of regulated constituents such as hydrocarbons (HC), oxides of nitrogen (NOx), and particulate matter (PM) in the exhaust discharged from vehicles containing diesel powerplants. As these systems have evolved, they have become increasingly complex and often bulky, giving rise to a variety of packaging issues which must be resolved for individual applications. In addition, the proliferation of parts and components making up each system tends to complicate both original equipment assembly and service in the field. Moreover, as the number of components increases, the effective surface area of the system as a whole tends to increase. This increase in surface area contributes to the amount of heat rejected from after-treatment system components. This heat loss not only causes packaging issues for neighboring components, but also tends to decrease after-treatment system effectiveness as rejected heat must be compensated when initiating or managing temperatures of system components.

Accordingly, it is desirable to have an improved after-treatment component that addresses these and other issues related to packaging and heat rejection of the after-treatment component while providing for reduced cost, complexity, and component count.

SUMMARY OF THE INVENTION

In one exemplary embodiment of the invention, an after-treatment component for receiving an exhaust stream from an internal combustion engine comprises a vessel having a first end, a second end, and an intermediate section disposed between the first end and the second end. The vessel comprises an outer shell that defines an inlet port and an outlet port. The inlet port is in fluid communication with an inlet diffuser disposed within the vessel. The inlet diffuser is in fluid communication with the inlet port and with a diesel oxidation catalyst disposed within the vessel. The diesel oxidation catalyst is in fluid communication with the inlet diffuser and with a transfer duct. The transfer duct is in fluid communication with the diesel oxidation catalyst and with an intermediate diffuser disposed within the vessel. The intermediate diffuser is in fluid communication with the transfer duct and with a catalyzed filter disposed within the vessel. The catalyzed filter is in fluid communication with the intermediate diffuser and with the exit nozzle.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE DRAWINGS

Figure 1:
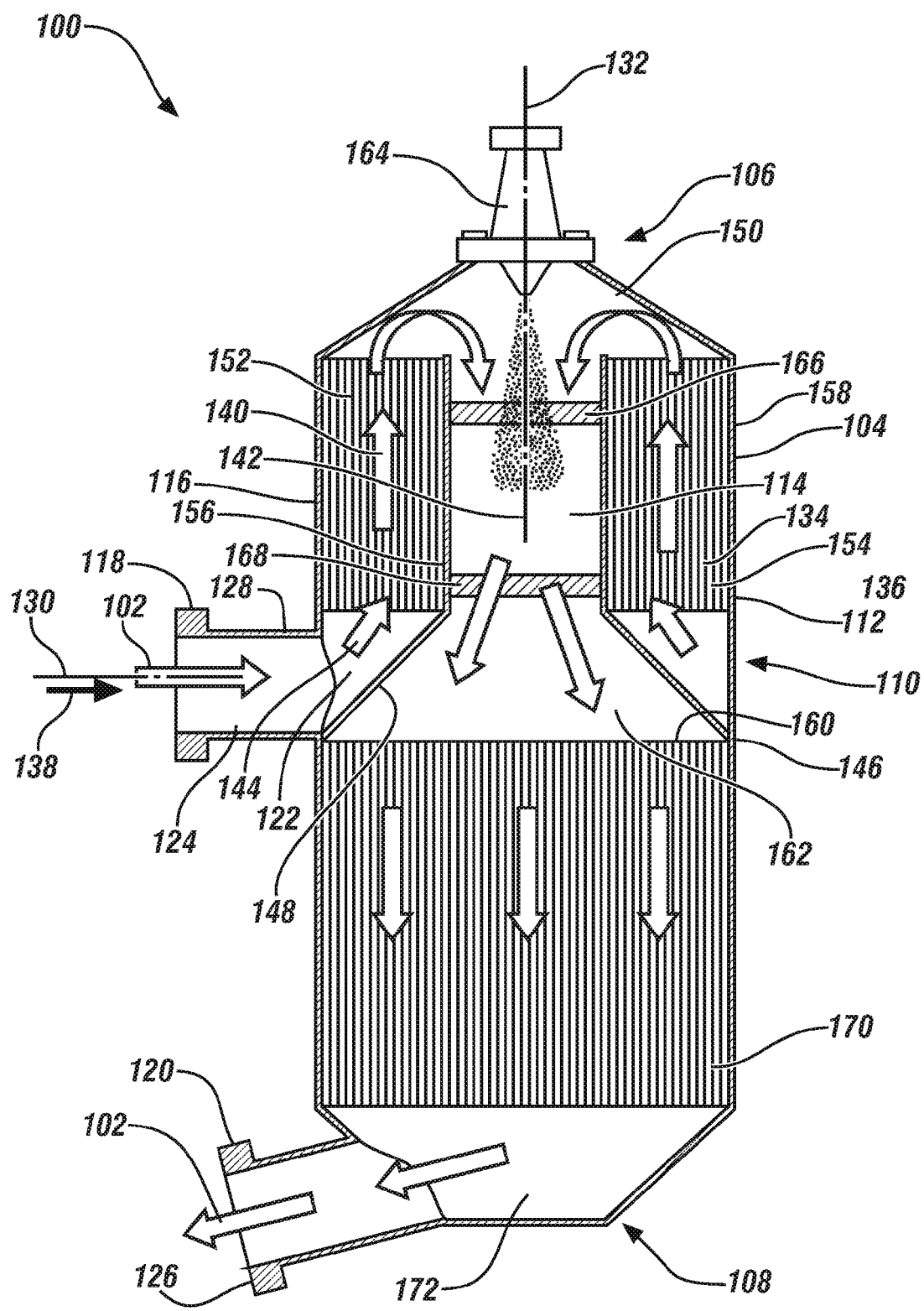
FIG. 1 is a cutaway drawing showing a cross-section of an exemplary after-treatment component.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, as shown in FIG. 1, an after-treatment component 100 comprises a vessel 104, which has a first end 106, a second end 108, and an intermediate section 110 that is disposed between the first end 106 and the second end 108. The after-treatment component 100 is configured for receiving an exhaust stream 102 from an internal combustion engine (not shown) and for discharging the exhaust stream 102, directly or indirectly, to the atmosphere. The vessel 104 comprises an outer shell 112 that contains, inside the shell, a number of components of the after-treatment component 100, such as a diesel oxidation catalyst 134 and a catalyzed filter 170. The vessel 104 also defines an inlet port 118 and an outlet port 120, though which the exhaust stream 102 enters and exits the vessel 104. In operation, the inlet port 118 is in fluid communication with an exhaust port (not shown) of the internal combustion engine, through which the exhaust stream 102 flows from the vehicle and enters the after-treatment component 100.

In an exemplary embodiment, the inlet port 118 is in fluid communication with an inlet diffuser 122 that is disposed interior to the outer shell 112 of the vessel 104, within the intermediate section 110 of the vessel 104. The inlet port 118 is configured for receiving the exhaust stream 102 from the exhaust port of the engine and delivering the exhaust stream 102 to the inlet diffuser 122.

In an exemplary embodiment, the vessel 104 is cylindrical in shape, having a circular cross section and being arranged along a longitudinal axis 132 of the vessel 104. It should be appreciated, however, that the vessel 104 may also have a cross-section that is eccentric (oval-shaped), rectangular, square, or triangular, with the shape of the outer shell 112 being configured so as to meet physical constraints dictated by the vehicle in which the after-treatment component 100 is to be installed. In one exemplary embodiment, the vessel 104 (excluding the inlet port 118 and the outlet port 120) is disposed substantially symmetrically about the longitudinal axis 132 of the vessel 104.

The inlet port 118 comprises an inlet duct 124 with an inlet flange that is positioned and configured for coupling the inlet port 118 to an exhaust system of a vehicle (e.g., to the exhaust port of the engine). The inlet duct 124 may comprise a cylindrical passage 128 and may be disposed along an inlet axis 130 that is disposed transversely to the longitudinal axis 132 of the vessel 104. It should be appreciated, however, that other orientations and cross-sectional shapes of the inlet duct 124 may be employed so as to meet physical constraints dictated by the vehicle in which the after-treatment component 100 is to be installed.

The inlet diffuser 122 is disposed within the intermediate section 110 of the vessel 104, is in fluid communication with the inlet port 118 and with the diesel oxidation catalyst 134. The inlet diffuser 122 is configured for receiving the exhaust stream 102 from the inlet port 118 and for delivering the exhaust stream 102 to an inlet end 136 of the diesel oxidation catalyst 134. The inlet diffuser 122 may be configured for turning the exhaust stream 102 from an inlet direction 138 that is aligned with the inlet port 118 to an oxidation catalyst direction 140 that is aligned with the longitudinal axis 132, about which the diesel oxidation catalyst 134 is disposed. The inlet diffuser 122 is configured for distributing the exhaust stream 102 that is received at one circumferential location 144, proximate the inlet port 118, and for distributing the exhaust stream 102 uniformly about the diesel oxidation catalyst 134 as the exhaust stream 102 flows through the diesel oxidation catalyst 134, substantially parallel to the longitudinal axis 132. In an exemplary embodiment, the diesel oxidation catalyst 134 is an annular volume, providing for a transfer duct 114 within an inner wall 156 of the diesel oxidation catalyst 134. In accordance with this embodiment, the inlet diffuser 122 is configured as a cone disposed symmetrically about the longitudinal axis 132 of the vessel 104, with a base 146 of the cone being substantially in contact with the outer shell 112 of the vessel 104, and with a top 148 of the cone being substantially in contact with the inner wall 156 of the diesel oxidation catalyst 134.

In an exemplary embodiment, the diesel oxidation catalyst 134 is disposed within the vessel 104, between the intermediate section 110 and the first end 106 of the vessel 104. In accordance with this embodiment, the diesel oxidation catalyst 134 is in fluid communication with both the inlet diffuser 122 and a flow reverser 150. The diesel oxidation catalyst 134 is configured for receiving the exhaust stream 102 from the inlet diffuser 122 and for delivering the exhaust stream 102 to the flow reverser 150. The diesel oxidation catalyst 134 is also configured for oxidizing certain constituents in the exhaust stream 102 (e.g., carbon monoxide, gas phase hydrocarbons, and the SOF fraction of diesel particulate matter) so as to convert them to preferred exhaust constituents, such as carbon dioxide and water, in the exhaust stream 102.

In an exemplary embodiment, the diesel oxidation catalyst 134 comprises a monolith honeycomb substrate 152 coated with platinum group metal catalyst. The honeycomb structure may define a plurality of relatively narrow, parallel channels 154 oriented in parallel to the longitudinal axis 132 so as to provide a relatively high contact surface area, to which the exhaust stream 102 is exposed as the exhaust stream 102 flows through the diesel oxidation catalyst 134. Thus, as the hot gases of the exhaust stream 102 contact the catalyst, certain constituents in the exhaust stream 102 are converted into carbon dioxide and water.

In an exemplary embodiment, the diesel oxidation catalyst 134 is configured as an annular volume disposed along the longitudinal axis 132. Accordingly the diesel oxidation catalyst 134 has an inner wall 156 and an outer wall 158, with the plurality of narrow passages being disposed between the inner wall 156 and the outer wall 158. The inner wall 156 defines a cylindrical transfer duct 114 that is disposed within the diesel oxidation catalyst 134, along the longitudinal axis 132 of the vessel 104. The transfer duct 114 may be disposed symmetrically about the longitudinal axis 132, and the diesel oxidation catalyst 134 may be disposed symmetrically about the transfer duct 114 as a substantially annular volume.

The flow reverser 150 is disposed within the vessel 104 proximate the first end 106 of the vessel 104. The flow reverser 150 is in fluid communication with both the diesel oxidation catalyst 134 and the transfer duct 114 that carries the exhaust stream 102 past the diesel oxidation catalyst 134 to an intermediate diffuser 162 that is proximate the inlet diffuser 122. The flow reverser 150 is configured for receiving the exhaust stream 102 from the diesel oxidation catalyst 134 with a flow direction that is along the longitudinal axis 132 toward the first end 106 and reversing a direction of the exhaust stream 102 so that it flows in a direction along the longitudinal axis 132 away from the first end 106. The flow reverser 150 may be configured as a dome disposed at the first end 106 of the vessel 104.

A diesel exhaust fluid (DEF) injector 164 may be disposed at the first end 106 of the vessel 104. The DEF injector 164 is in fluid communication with a source of DEF fluid and is configured for injecting a stream/spray of the DEF fluid into the vessel 104 at a position within the vessel 104 where the exhaust stream 102 has exited the diesel oxidation catalyst 134, such as within the flow reverser 150 or within the transfer duct 114. It should be appreciated that the supply of DEF fluid may be arranged so as to meet packaging requirements that may be imposed by the particular application in which the after-treatment component 100 is to be implemented. For example, in some transversely mounted configurations, such as wherein both the cylindrical passage 128 and outlet port 120 are arranged transversely to the longitudinal axis 132, it may be advantageous for the source of DEF fluid to also be provided along a direction that is transverse to the longitudinal axis 132. Alternatively, the supply of DEF fluid may be arranged along the longitudinal axis 132.

It should be appreciated that a diesel engine, from time to time, may be operated at a lean air-to-fuel ratio to ensure the complete or near-complete combustion of soot and to prevent emission of un-oxidized fuel. Unfortunately, excessive levels of oxygen that may be present in the exhaust stream 102 (e.g., when the diesel engine is being operated at lean air-to-fuel ratio) may lead to generation of nitrogen oxides (NOx), which may be regulated. Selective catalytic reduction may be used to reduce the amount of NOx released into the air using DEF. Diesel exhaust fluid vaporizes and decomposes to form ammonia and carbon dioxide which catalytically reduces the NOx constituents into water (H2O) and nitrogen (N2).

In an exemplary embodiment, the transfer duct 114 is disposed within the vessel 104 adjacent to the diesel oxidation catalyst 134. The transfer duct 114 is in fluid communication with both the flow reverser 150 and the intermediate diffuser 162. The transfer duct 114 is configured for receiving the exhaust stream 102 from the flow reverser 150 and for carrying the exhaust stream 102 past the diesel oxidation catalyst 134 and for ultimately delivering the exhaust stream 102 to the intermediate diffuser 162. As discussed above, in an exemplary embodiment, the transfer duct 114 is defined by the inner wall 156 of the diesel oxidation catalyst 134. In an exemplary embodiment, the transfer duct 114 comprises a first mixing section 166 that is configured for mixing injected DEF fluid into the exhaust stream 102. The transfer duct 114 may also comprise a second mixing section 168 configured for mixing injected DEF fluid into the exhaust stream 102. While the described embodiment includes the first mixing section 166 and the second mixing section 168, it should be appreciated that any number of mixing sections may be used to address the specific needs and constraints of each particular application. For example, in some embodiments, wherein natural mixing is sufficient, there may be no appreciable need for any mixing sections. The first mixing section 166 may be configured for inducing a swirl component to the exhaust stream 102, while the second mixing section 168 may be configured for adding to, or decreasing, the swirl component of the exhaust stream 102.

The intermediate diffuser 162 is disposed within the intermediate section 110 of the vessel 104. The intermediate diffuser 162 is in fluid communication with both the transfer duct 114 and a catalyzed filter (SCRF) 170. The intermediate diffuser 162 is configured for receiving the exhaust stream 102 from the transfer duct 114 and for delivering the exhaust stream 102 to the inlet end 160 of the catalyzed filter 170. The intermediate diffuser 162 may be defined by the same structure (i.e., a cone) that defines the inlet diffuser 122. Thus, the intermediate diffuser 162 may be configured as a cone disposed about the longitudinal axis 132 of the vessel 104, with the base 146 of the cone being substantially in contact with the outer shell 112 of the vessel 104, and with a top of the cone being substantially in contact with the transfer duct 114. The transfer duct 114 may be defined by the inner wall 156 of the diesel oxidation catalyst 134.

The catalyzed filter 170 may be disposed within the vessel 104, between the intermediate section 110 and the second end 108 of the vessel 104. The catalyzed filter 170 is in fluid communication with both the intermediate diffuser 162 and the exit nozzle 172. The catalyzed filter 170 is configured for receiving the exhaust stream 102 from the intermediate diffuser 162 and for delivering the exhaust stream 102 to the exit nozzle 172. The catalyzed filter 170 is configured to react the NOx in the exhaust stream 102 with ammonia that derives from the injected DEF fluid (e.g., urea solution), thereby reducing the NOx to nitrogen and water. In addition, the catalyzed filter 170 is configured to collect particulate matter such as soot that may be present in the exhaust stream 102. Periodically, heat may be added to the exhaust stream 102 and/or to the catalyzed filter 170 so as to induce regeneration of the catalyzed filter 170. The catalyzed filter 170 is configured not only to collect particulate matter (soot) at relatively high collection efficiencies, but also to facilitate burning off the collected particulate matter into carbon dioxide and water. The combustion of collected particulate matter may be achieved by maintaining sufficient temperatures of the exhaust stream 102 as it passes through the catalyzed filter 170.

It should be appreciated that the need for input of additional heat can be mitigated, however, by the reverse-flow configuration of the diesel oxidation catalyst 134 described above. In the diesel oxidation catalyst 134, wherein an inlet stream of exhaust gas flows through an outer annulus in a first direction and then is reversed during a DEF injection process so as to flow through the transfer duct 114 defined by an inner wall 156 of the diesel oxidation catalyst 134, the heat transferred through the inner wall 156 of the diesel oxidation catalyst 134 is recaptured by the exhaust stream 102 as the exhaust stream 102 passes through the transfer duct 114. This heat recovery is particularly effective where the exhaust stream 102 is cooled by the injection of DEF after the exhaust stream 102 departs the diesel oxidation catalyst 134 and before the exhaust stream 102 passes through all or part of the transfer duct 114, which is positioned and configured for receiving heat from the diesel oxidation catalyst 134.

The exit nozzle 172 is disposed proximate the second end 108 of the vessel 104. The exit nozzle 172 is in fluid communication with the catalyzed filter 170 and with an exit flange 126, which is defined by the vessel 104 at the second end 108 of the vessel 104. The exit nozzle 172 is configured for receiving the exhaust stream 102 from the catalyzed filter 170 and for delivering the exhaust stream 102 to the exit flange 126. The exit nozzle 172 may be configured for turning the exhaust stream 102 from a direction that is aligned with the longitudinal axis 132 to an exit direction that is suitable for delivery to a tailpipe of the host vehicle. The exit nozzle 172 is configured for collecting the exhaust stream 102 received across the exit plane of the catalyzed filter 170 and for delivering the exhaust stream 102 to the exit flange 126. Thus, the exit nozzle 172 may be configured as a cone, or as a portion of a cone, having the base 146 that is in contact with the outer shell 112 of the vessel 104, proximate the exit of the catalyzed filter 170.

To aid in the control over the injection of DEF into the after-treatment component 100 or the introduction of heat so as to initiate regeneration of one or more sub-elements of the after-treatment component 100, one of more NOx sensors may be disposed at strategic locations within or about the after-treatment component 100. For example, a NOx sensor may be disposed in the inlet duct 124 or in the inlet diffuser 122, upstream from the diesel oxidation catalyst 134. Similarly, another NOx sensor may be disposed downstream from the catalyzed filter 170, such as in the exit nozzle 172. Accordingly effectiveness of the after-treatment component 100 at reducing NOx emissions may be monitored, and control may be affected over the functioning and/or maintenance of the after-treatment component 100.

Figure 2:
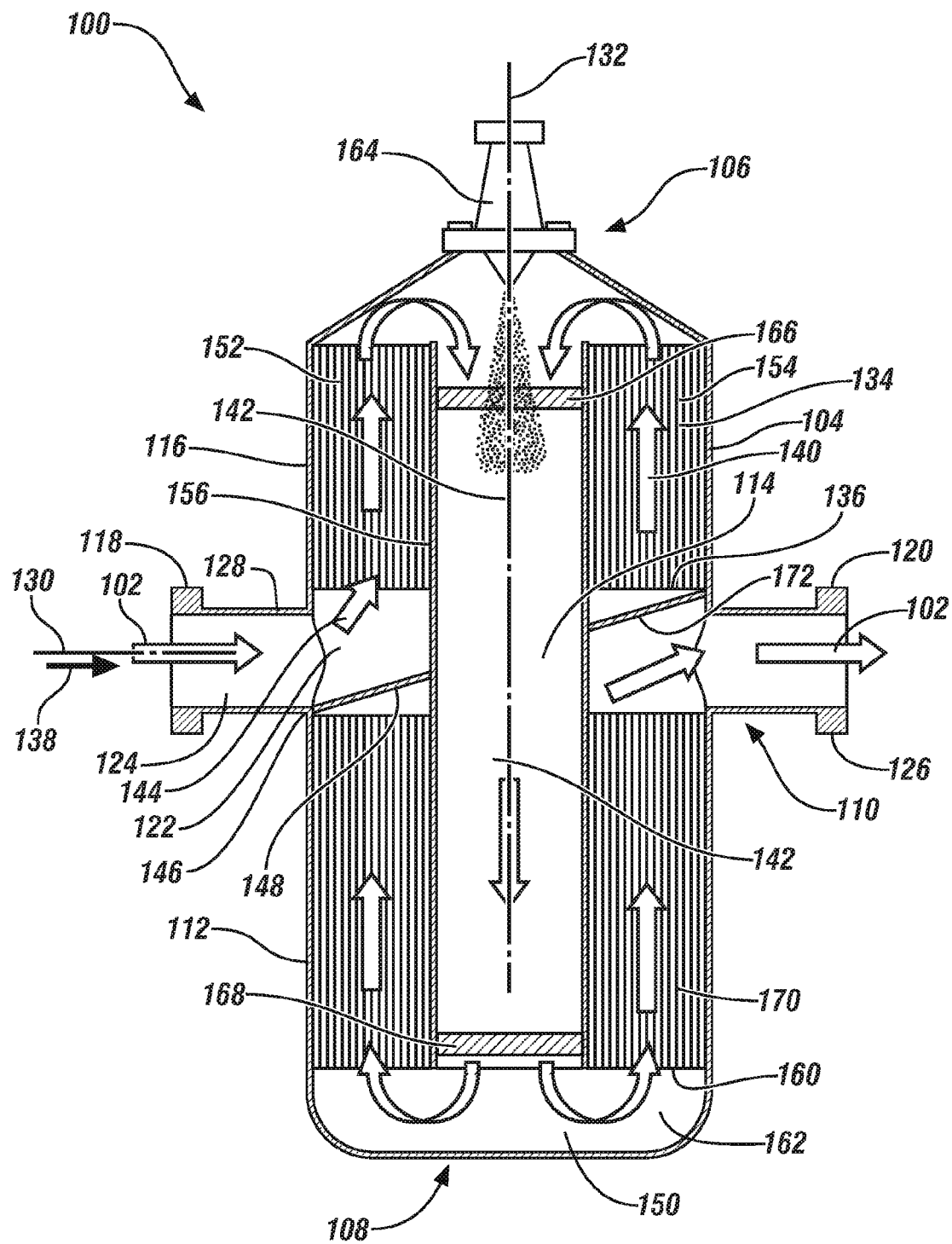
FIG. 2 is a cutaway drawing showing a cross-section of an exemplary after-treatment component.

In an exemplary embodiment, as shown in FIG. 2, the transfer duct 114 may be defined by the inner wall 156 of both the diesel oxidation catalyst 134 and the catalyzed filter 170. Accordingly, the intermediate diffuser 162 is disposed adjacent to the second end 108 of the vessel 104, and the exit nozzle 172 is disposed in the intermediate section 110 of the vessel 104. In addition, the intermediate diffuser 162 is disposed adjacent to the second end 108 and is configured not only for expanding the exhaust stream 102 but also for reversing the direction of the exhaust stream 102 so as to direct the exhaust stream 102 for interaction with the catalyzed filter 170 (i.e., toward the interior of the vessel 104). In accordance with this embodiment, the exit nozzle 172 and the inlet diffuser 122 may be defined by opposing sides of a unitary structure such as a sheet of metal.

Figure 3:
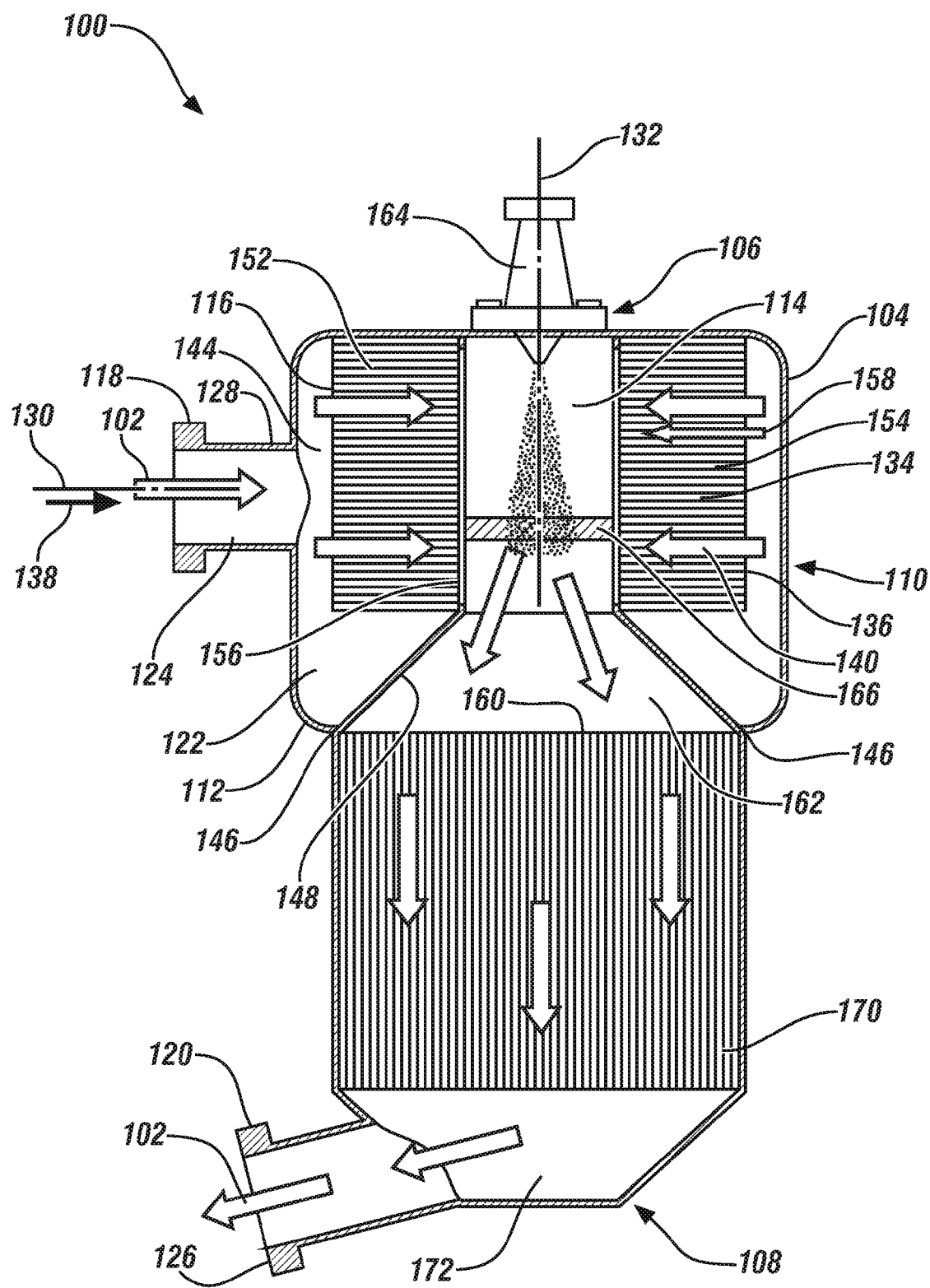
FIG. 3 is a cutaway drawing showing a cross-section of an exemplary after-treatment component.

In an exemplary embodiment, as shown in FIG. 3, the plurality of channels in the diesel oxidation catalyst 134 may be oriented transversely to the longitudinal axis 132 of the vessel 104. Accordingly, the inlet diffuser 122 may be disposed circumferentially about the diesel oxidation catalyst 134, and the plurality of channels may be configured for carrying the exhaust stream 102 directly to the transfer duct 114, within which DEF may be injected into the exhaust stream 102, and wherein the exhaust stream 102 may be directed toward, and carried to, the intermediate diffuser 162.

Figure 4:
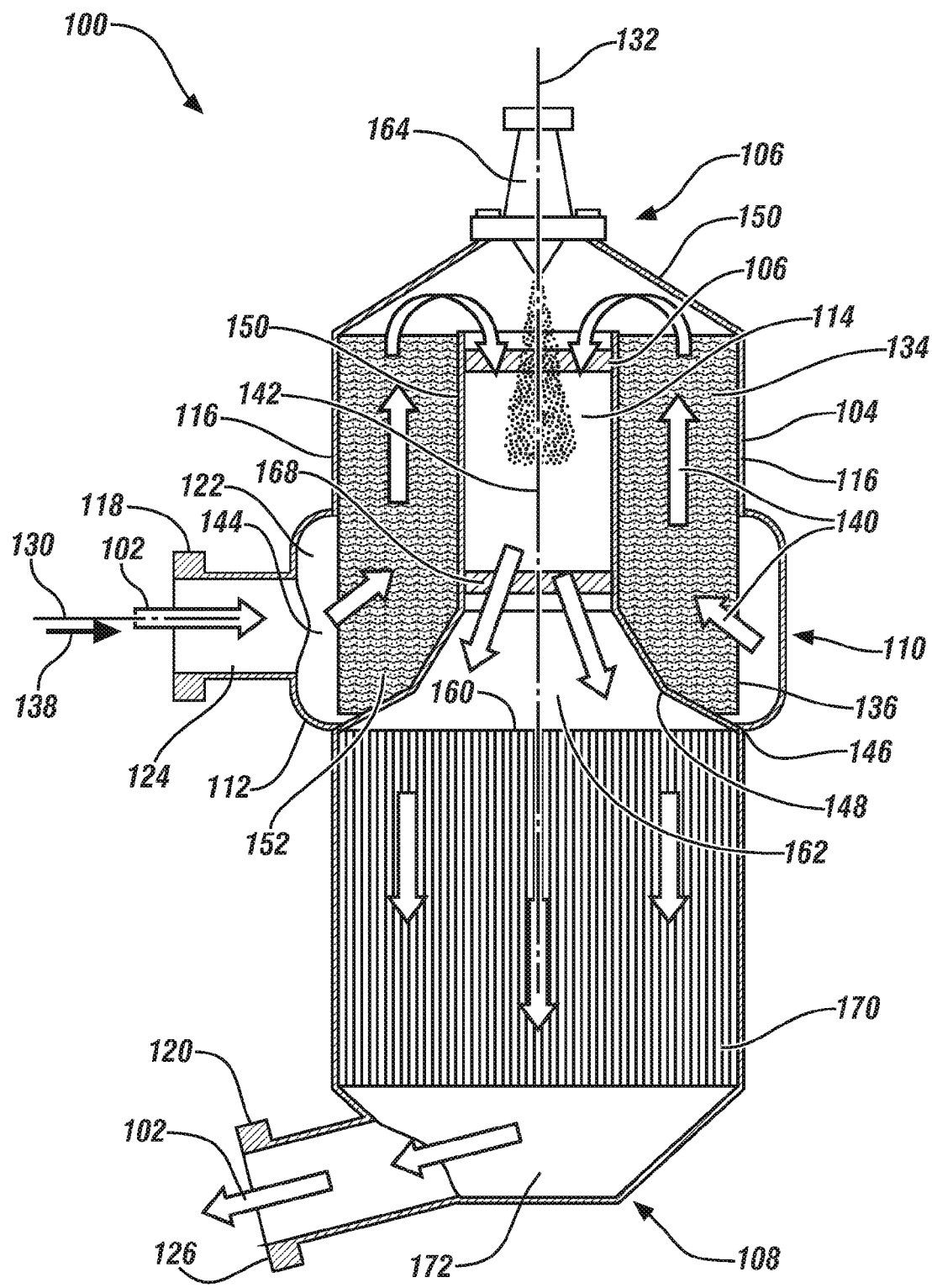
FIG. 4 is a cutaway drawing showing a cross-section of an exemplary after-treatment component.

In an exemplary embodiment, as shown in FIG. 4, the plurality of channels in the diesel oxidation catalyst 134 may be oriented both transversely to, and parallel to, the longitudinal axis 132 of the vessel 104. Accordingly, the inlet diffuser 122 may be disposed circumferentially about the diesel oxidation catalyst 134, and the plurality of channels may be configured for carrying the exhaust stream 102 radially inward from the outer shell 112, which serves as a radially outward wall of the diesel oxidation catalyst 134, and for delivering the exhaust stream 102 along the longitudinal axis 132 to the flow reverser 150, which is located at the first end 106 of the vessel 104.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An after-treatment component for receiving an exhaust stream from an internal combustion engine, the after-treatment component comprising:
   a vessel having a first end, a second end, and an intermediate section disposed between the first end and the second end, the vessel comprising an outer shell that defines an inlet port and an outlet port;
   the inlet port being in fluid communication with an inlet diffuser disposed within the vessel;
   the inlet diffuser, configured as a cone disposed about a longitudinal axis of the vessel with a base of the cone in contact with the outer shell of the vessel and with a top of the cone in contact with an inner wall of a diesel oxidation catalyst disposed within the vessel, being in fluid communication with the inlet port and with the diesel oxidation catalyst;
   the diesel oxidation catalyst being in fluid communication with the inlet diffuser and with a transfer duct;
   the transfer duct being in fluid communication with the diesel oxidation catalyst and with an intermediate diffuser disposed within the vessel;
   the intermediate diffuser being in fluid communication with the transfer duct and with a catalyzed filter disposed within the vessel; and
   the catalyzed filter being in fluid communication with the intermediate diffuser and with the outlet port.

2. The after-treatment component of claim 1, wherein the vessel is disposed along a longitudinal axis, and wherein the diesel oxidation catalyst is configured as an annular volume disposed along the longitudinal axis.

3. The after-treatment component of claim 2, wherein the diesel oxidation catalyst has an inner wall and an outer wall and defines a plurality of narrow passages disposed between the inner wall and the outer wall.

4. The after-treatment component of claim 3:
   wherein the inner wall defines the transfer duct disposed about the longitudinal axis of the vessel; and
   wherein the annular volume is disposed about the transfer duct.

5. The after-treatment component of claim 4:
   wherein the diesel oxidation catalyst defines a plurality of channels disposed substantially parallel to the longitudinal axis of the vessel;
   further comprising a flow reverser disposed within the vessel in fluid communication with the diesel oxidation catalyst and with the transfer duct, the flow reverser being configured for receiving the exhaust stream from the diesel oxidation catalyst with a flow direction that is along the longitudinal axis toward the first end and reversing a direction of the exhaust stream so that it flows in a direction along the longitudinal axis away from the first end.

6. The after-treatment component of claim 5, wherein the flow reverser is configured as a dome and is disposed at the first end of the vessel.

7. The after-treatment component of claim 4:
   wherein the transfer duct is defined by the inner wall of the diesel oxidation catalyst; and
   wherein the transfer duct is further defined by an inner wall of the catalyzed filter.

8. The after-treatment component of claim 7:
   wherein the intermediate diffuser is disposed adjacent to the second end of the vessel;
   wherein the outlet port is disposed in the intermediate section of the vessel; and
   wherein the intermediate diffuser is configured for reversing a direction of the exhaust stream.

9. The after-treatment component of claim 8, wherein the outlet port and the inlet diffuser are defined by opposing sides of a unitary structure.

10. The after-treatment component of claim 4:
    wherein the diesel oxidation catalyst defines a plurality of channels disposed substantially transverse to the longitudinal axis of the vessel;
    wherein the inlet diffuser is disposed circumferentially about the diesel oxidation catalyst; and
    wherein the plurality of channels are configured and arranged for carrying the exhaust stream directly to the transfer duct; and
    wherein the transfer duct is disposed along the longitudinal axis of the vessel.

11. The after-treatment component of claim 10, further comprising a diesel exhaust fluid injector disposed for injecting diesel exhaust fluid into the exhaust stream upstream from the intermediate diffuser.

12. The after-treatment component of claim 4, wherein the diesel oxidation catalyst defines a plurality of channels disposed for receiving an exhaust stream substantially transverse to the longitudinal axis of the vessel and discharging the exhaust stream substantially parallel to the longitudinal axis of the vessel.

13. The after-treatment component of claim 12:
    further comprising a flow reverser disposed at the first end of the vessel;
    wherein the inlet diffuser is disposed circumferentially about the diesel oxidation catalyst; and
    wherein the plurality of channels are configured for carrying the exhaust stream radially inward from a radially outward wall of the diesel oxidation catalyst and delivering the exhaust stream along the longitudinal direction to the flow reverser located at the first end of the vessel.

14. The after-treatment component of claim 1, wherein the inlet diffuser is configured for turning the exhaust stream from an inlet direction that is aligned with the inlet port to an oxidation catalyst direction that is aligned with an axis of the diesel oxidation catalyst.

15. The after-treatment component of claim 1, further comprising a diesel exhaust fluid injector disposed at the first end of the vessel, the diesel exhaust fluid injector being in fluid communication with a source of diesel exhaust fluid and being configured for injecting diesel exhaust fluid into the exhaust stream downstream from the diesel oxidation catalyst.

16. An after-treatment component comprising:
    a vessel extending along a longitudinal axis, having an outer shell that defines an inlet port and an outlet port disposed in an intermediate section that is disposed between a first end and a second end;
    a diesel oxidation catalyst disposed within vessel, the diesel oxidation catalyst having a plurality of narrow passages disposed between an inner wall and an outer wall;
    an inlet diffuser in fluid communication with the inlet port and the diesel oxidation catalyst, the inlet diffuser having a base in contact with the outer shell of the vessel and a top in contact with the inner wall of the diesel oxidation catalyst;
    a transfer duct defined by the inner wall of the diesel oxidation catalyst, the transfer duct extending from the top of the inlet diffuser towards the first end and is in fluid communication with the inlet diffuser;

a first mixing section disposed within the transfer duct disposed proximate a flow reverser at the first end of the vessel;

a second mixing section disposed within the transfer duct disposed proximate the top of the inlet diffuser; and an intermediate diffuser defined by the inlet diffuser, the intermediate diffuser is disposed within the intermediate section of the vessel proximate the second mixing section in fluid communication with the diesel oxidation catalyst and a catalyzed filter disposed proximate the second end of the vessel.

17. The after-treatment component of claim 16, wherein the inlet port and the outlet port are disposed on opposite sides of the intermediate section.

18. The after-treatment component of claim 16, wherein the first mixing section is disposed proximate the first end of the vessel and the second mixing section is disposed proximate the second end of the vessel.

19. The after-treatment component of claim 16, wherein the first mixing section is configured for inducing a swirl component to an exhaust stream to mix a diesel exhaust fluid injected by a diesel exhaust fluid injector into the exhaust stream.

20. The after-treatment component of claim 19, wherein the second mixing section is configured for modifying the swirl component.

* * * * *